US012650916B2

(12) United States Patent
Dev et al.

(10) Patent No.: US 12,650,916 B2
(45) Date of Patent: Jun. 9, 2026

(54) GENERATIVE AI-BASED STRATEGY DEVELOPMENT AND MAINTENANCE

(71) Applicant: PayPal, Inc., San Jose, CA (US)

(72) Inventors: Harsh Dev, Sunnyvale, CA (US); Ajinkya Prakash Kulkarni, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 366 days.

(21) Appl. No.: 18/362,086

(22) Filed: Jul. 31, 2023

(65) Prior Publication Data

US 2025/0045194 A1     Feb. 6, 2025

(51) Int. Cl.
*G06F 8/40*          (2018.01)
*G06F 11/3698*       (2025.01)

(52) U.S. Cl.
CPC ............ *G06F 11/3698* (2025.01); *G06F 8/40* (2013.01)

(58) Field of Classification Search
CPC ..... G06F 8/40; G06F 11/3688; G06F 11/3698
See application file for complete search history.

(56) References Cited

U.S. PATENT DOCUMENTS

| | | | |
|---|---|---|---|
| 10,535,120 B2 | 1/2020 | Edwards et al. | |
| 11,061,650 B2 | 7/2021 | Turek et al. | |
| 12,039,325 B2 * | 7/2024 | Ramasamy | ...... G06Q 10/06398 |
| 12,277,052 B2 * | 4/2025 | Wilson | ...................... G06F 8/60 |
| 2021/0275918 A1 | 9/2021 | Devaranjan et al. | |
| 2023/0135553 A1 | 5/2023 | Cella et al. | |
| 2025/0045024 A1 * | 2/2025 | Ngiam | ...................... G06F 8/35 |

OTHER PUBLICATIONS

Xue Jiang et al., "Self-planning Code Generation with Large Language Models," arXiv, Mar. 2023, retrieved online Sep. 29, 2025, pp. 1-31. Retrieved from the Internet: <URL: https://arxiv. org/pdf/2303.06689>. (Year: 2023).*

* cited by examiner

*Primary Examiner* — Hanh Thi-Minh Bui
(74) *Attorney, Agent, or Firm* — Kowert, Hood, Munyon, Rankin & Goetzel, P.C.; Scott W. Pape; Dean M. Munyon

(57)               ABSTRACT

Techniques are disclosed relating to transforming, by a computer system in response to a request to develop an evaluation strategy, the request into a first query for an artificial intelligence (AI) tool. The computer system may retrieve historical information that is related to the first query. The computer system may submit the first query to the AI tool. In response to receiving evaluation strategy information, the computer system may transform the evaluation strategy information into a second query for the AI tool. The computer system may submit the second query to the AI tool. In response to receiving executable code, the computer system may modify the executable code for compatibility with a particular computer system. The computer system may test performance of the modified executable code, and indicate that the modified executable code satisfies one or more performance thresholds for a code release.

20 Claims, 6 Drawing Sheets

500

System 100

Development Process 200

Development Process 300

400

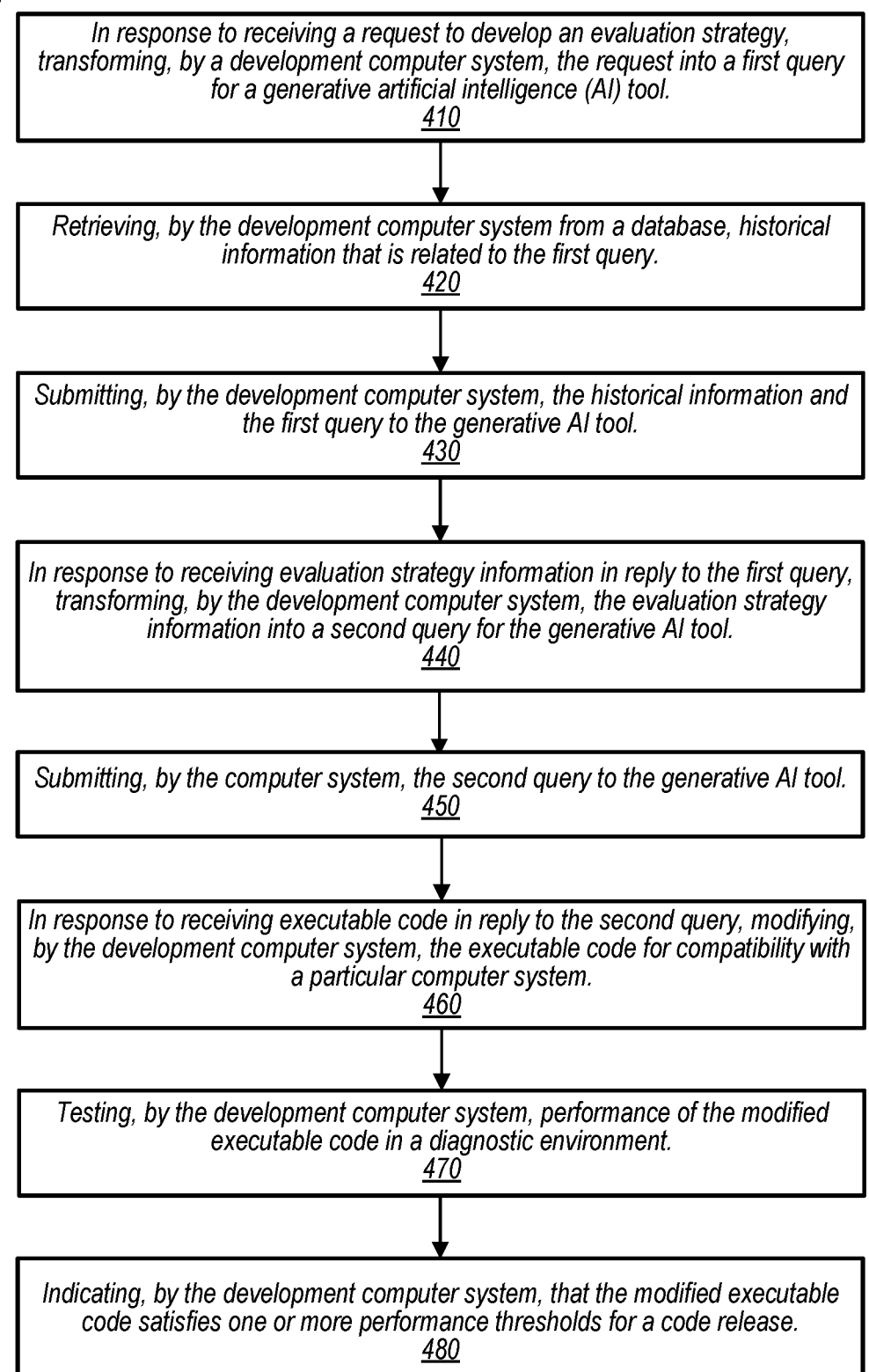

*In response to receiving a request to develop an evaluation strategy, transforming, by a development computer system, the request into a first query for a generative artificial intelligence (AI) tool.*
*410*

*Retrieving, by the development computer system from a database, historical information that is related to the first query.*
*420*

*Submitting, by the development computer system, the historical information and the first query to the generative AI tool.*
*430*

*In response to receiving evaluation strategy information in reply to the first query, transforming, by the development computer system, the evaluation strategy information into a second query for the generative AI tool.*
*440*

*Submitting, by the computer system, the second query to the generative AI tool.*
*450*

*In response to receiving executable code in reply to the second query, modifying, by the development computer system, the executable code for compatibility with a particular computer system.*
*460*

*Testing, by the development computer system, performance of the modified executable code in a diagnostic environment.*
*470*

*Indicating, by the development computer system, that the modified executable code satisfies one or more performance thresholds for a code release.*
*480*

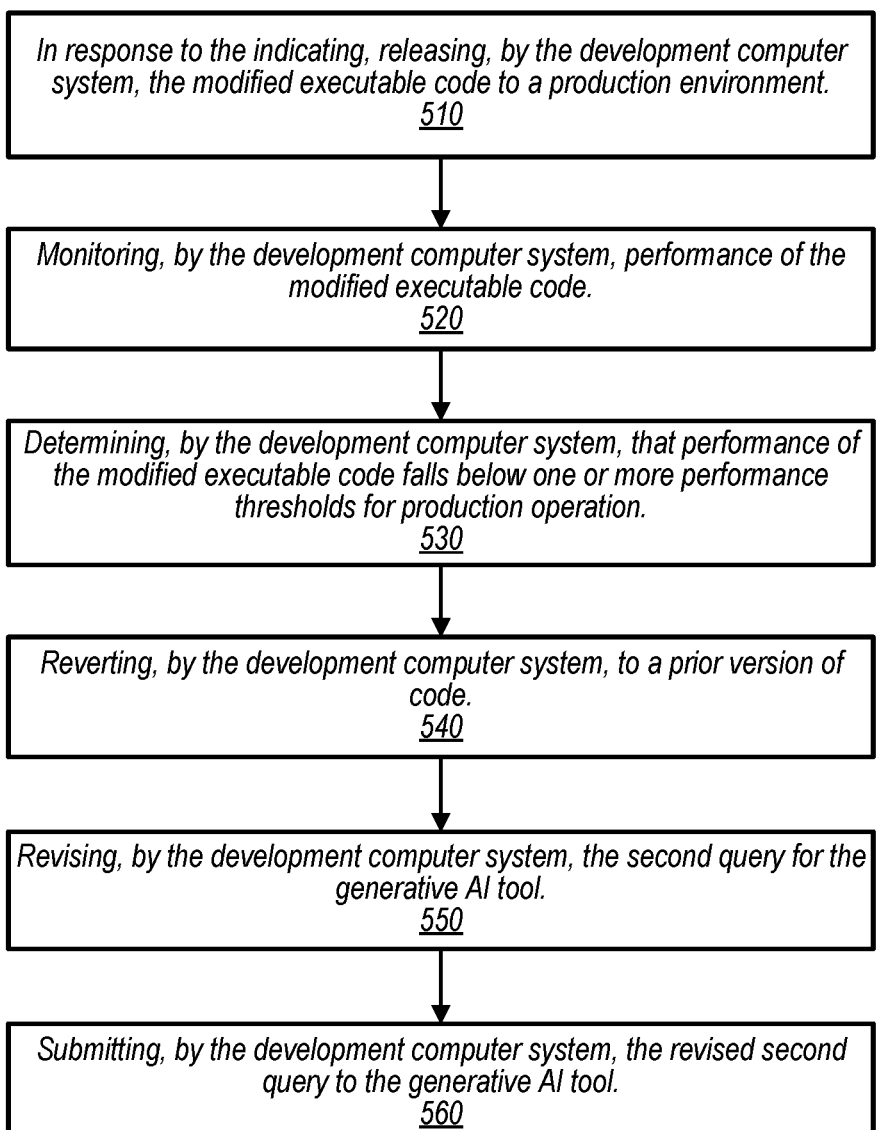

In response to the indicating, releasing, by the development computer system, the modified executable code to a production environment.
<u>510</u>

Monitoring, by the development computer system, performance of the modified executable code.
<u>520</u>

Determining, by the development computer system, that performance of the modified executable code falls below one or more performance thresholds for production operation.
<u>530</u>

Reverting, by the development computer system, to a prior version of code.
<u>540</u>

Revising, by the development computer system, the second query for the generative AI tool.
<u>550</u>

Submitting, by the development computer system, the revised second query to the generative AI tool.
<u>560</u>

*FIG. 5*

GENERATIVE AI-BASED STRATEGY DEVELOPMENT AND MAINTENANCE

BACKGROUND

Technical Field

Embodiments described herein are related to the field of computer system management, and more particularly to techniques for developing evaluation code.

Description of the Related Art

Evaluation strategies may be used within the operation and management of a computer system for a variety reasons. For example, evaluation strategies may determine techniques and rules for enforcing proper storage of sensitive information within a database. Stored data objects may be evaluated to determine if any types of sensitive information are included a given data object and based on the particular types identified, further evaluated to determine if the storage the given data item satisfies the rules for storage of the particular types. Other examples for using evaluation strategies include setting rules and techniques for determining whether new users should be approved for account access, setting rules and techniques for determining whether an attempted electronic exchange is valid or fraudulent, and so forth.

Development of an evaluation strategy may include several stages, including identifying current problems to solve, researching current solutions based on existing data, developing one or more sets of hypothetical rules to solve the problem and simulating usage of various sets, and selecting an appropriate set of rules. Development of the sets of hypothetical rules may include writing a given set of rules, generating applicable test data, simulating sets of rules with the test data, validating test results, and documenting test results and any strategy changes. Completing all stages may require months to complete.

BRIEF DESCRIPTION OF THE DRAWINGS

The following detailed description makes reference to the accompanying drawings, which are now briefly described.

FIG. 4 illustrates a flow diagram of an embodiment of a method for generating executable code to implement an evaluation strategy.

FIG. 5 shows a flow diagram of an embodiment of a method for releasing and monitoring code to implement an evaluation strategy.

DETAILED DESCRIPTION OF EMBODIMENTS

Techniques are disclosed herein for implementing an artificial intelligence (AI)-based rules management system that leverages a generative AI tool (e.g., Open AI) for the automated development and implementation of evaluation strategies. The system analyzes data, generates strategies, generates code for implementing rules, and monitors performance both before and after a live-release, enabling more efficient and effective evaluation of stored data objects, electronic exchanges, user requests, and the like. Use of such a system may reduce a time for developing and rolling-out a new evaluation strategy, as well as increasing evaluation accuracy and reducing errant decisions. Such benefits may improve performance of computer system to which a new evaluation strategy is rolled-out.

Four main modules implemented in this system, evaluation strategy development, rule generator, integration, and performance monitoring. The evaluation strategy development returns evaluation strategies concerning various parameters associated with an evaluation process. The rule generator returns executable code for implementing rules to enforce the evaluation strategies. The integration module modifies the executable code to be compatible with a particular computer system environment. The performance monitoring module tracks performance of the modified code within the particular enterprise architecture before and after a live release.

Figure 1:
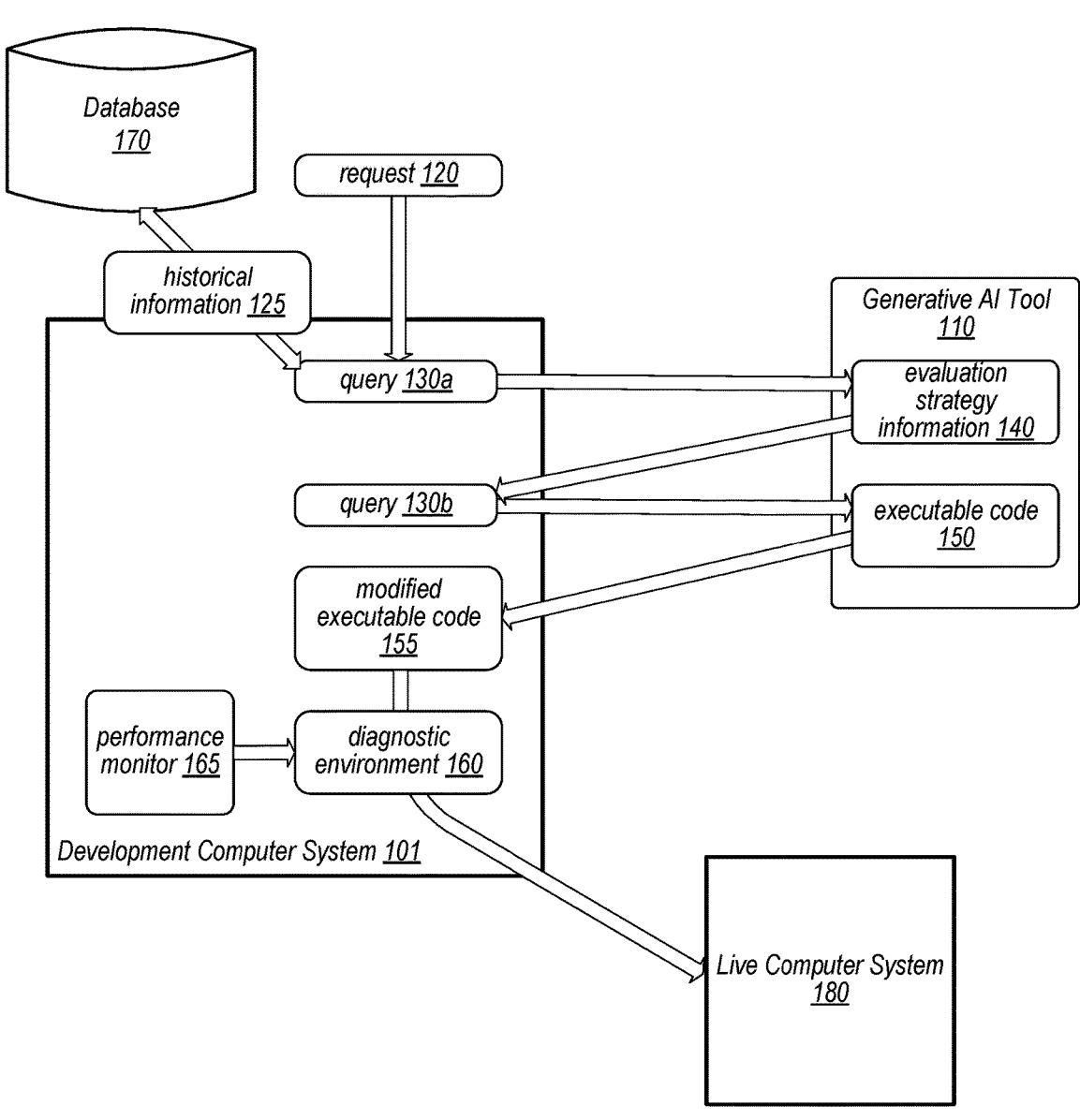
FIG. 1 illustrates a block diagram of an embodiment of a system for generating an evaluation strategy.

A block diagram for an embodiment of a system for developing an evaluation strategy is illustrated in FIG. 1. As shown, system 100 includes development computer system 101, generative artificial intelligence (AI) tool 110, database 170, and live computer system 180. Development computer system 101 and live computer system 180, in various embodiments, may be implemented, for example, combined as a single computer system, individually as separate computer systems, as a plurality of computer systems in a data center, as a plurality of computer systems across a plurality of data centers, and other such embodiments. In some embodiments, development computer system 101 and/or live computer system 180 may be implemented as one or more virtual computer systems hosted by one or more server computer systems. Development computer system 101 and/or or live computer system 180 may be included as part of an enterprise computer system or online service that, for example, authorizes electronic exchanges between user accounts. Generative AI tool 110 may be included within development computer system 101, included within live computer system 180, as an external third-party service, or any other suitable embodiment. In a similar manner, database 170 may be included within either of development computer system 101, live computer system 180, separate but in a same data center as computer systems 101 and 180, or as an external third-party database service.

As illustrated, development computer system 101 may include one or more processor circuits and a memory circuit that includes instructions that when executed by processor circuit, cause the system to perform operations described herein. As shown, development computer system 101 is operable to receive request 120 to develop a new evaluation strategy using generative AI tool 110. Request 120 may include information, e.g., plain-language text describing one or more goals for the requested evaluation strategy. In response to receiving request 120, development computer system 101 may generate, using the information included in request 120, query 130*a* to generative AI tool 110. Development computer system 101 may transform request 120 into query 130*a* using historical information 125 retrieved from database 170. For example, development computer system 101 may perform natural-language processing on the information in request 120 to determine one or more intents (e.g., goals) for the requested evaluation strategy. Based on these determined intents, development computer system 101 retrieves historical information 125 from database 170.

Historical information 125 includes information relevant to the requested evaluation strategy. For example, if the request is for a new evaluation strategy for scanning stored data for compliance to storage rules, then historical information 125 may include information from logs of previously completed scans using prior scanning strategies. If the request is for a new evaluation strategy for determining whether a requested electronic exchange may be fraudulent, then historical information 125 may include information from logs of previously identified fraudulent activity.

Development computer system 101 may preprocess historical information 125 prior to submitting query 130*a* to remove of sensitive information. Such sensitive information may include personal information, proprietary information related to past results, and the like. Query 130*a* is generated using the determined intents and processed historical information 125. Development computer system 101 may then submit the processed historical information 125 and query 130*a* to generative AI tool 110. Generative AI tool 110 may be any suitable AI tool capable of developing an evaluation strategy, including developing program code, such as Open AI, scikit-learn, Vertex AI, Amazon Forecast, Keysight Eggplant Platform, and others. In response to query 130*a*, generative AI tool 110 generates evaluation strategy information 140, including one or more actionable strategies focused on the intents determined from request 120. Generative AI tool 110 may analyze the information provided in query 130*a* to detect particular patterns and relationships that are relevant to the determined intents, and generate the one or more actionable strategies based on the analysis. Generative AI tool 110 may then provide evaluation strategy information 140 to development computer system 101.

In response to receiving evaluation strategy information 140 in reply to query 130*a*, development computer system 101 may, using evaluation strategy information 140, generate query 130*b* for generative AI tool 110 to create executable code 150. For example, development computer system 101 may transform evaluation strategy information 140 into query 130*b* by applying a coding framework to strategies and goals included in evaluation strategy information 140, thereby creating requests for executable code to implement the received strategies. Development computer system 101 may then submit query 130*a* to generative AI tool 110. In some embodiments, development computer system 101 may, using evaluation strategy information 140, also generate a third query (e.g., query 130*c*, not shown) for generative AI tool 110 to create test cases for evaluating executable code 150. In a similar manner as generating query 130*b*, a test case framework may be applied to the strategies and goals included in evaluation strategy information 140 to generate query 130*c*, which may be submitted to generative AI tool 110.

In response to receiving executable code 150 in reply to query 130*b*, development computer system 101 may integrate executable code 150 for use in live computer system 180. As illustrated, live computer system 180 may be included in a production computer system, e.g., to perform one or more operations associated with a an enterprise computer system such as an online service, educational computer data center, corporate computer network, and the like. Live computer system 180 may include a particular operating environment that supports one or more types of program code. In addition, live computer system 180 <inputs/outputs> may receive data in one or more particular formats and produce outputs in similar or different formats.

Integration of executable code 150 may include modifying, by development computer system 101, executable code 150 for compatibility with the various input and output formats of live computer system 180, thereby generating modified executable code 155.

Although created to run on live computer system 180, modified executable code 155 may not be released for use right after generation. Prior to a release, testing, by development computer system 101, may be performed on modified executable code 155 in diagnostic environment 160. As shown, diagnostic environment 160 is included in development computer system 101. In other embodiments, however, diagnostic environment 160 may be implemented as a controlled portion of live computer system 180 in which strict rules may be enforced restricting information that may enter and leave diagnostic environment 160. In some embodiments, diagnostic environment 160 may be implemented in a different computer system from both development computer system 101 and live computer system 180. If applicable, evaluating performance of modified executable code 155 in diagnostic environment 160 may be performed in response to receiving test cases in reply to query 130*c*.

Performance monitor 165, as illustrated, is used to monitor performance of modified executable code 155 in diagnostic environment 160. During this testing, modified executable code 155 may be exercised using various test cases to generate corresponding output. Performance is judged, for example, based on how well the generated outputs correspond to the strategies and goals from evaluation strategy information 140 for each of the test cases.

Based on the testing, development computer system 101 may indicate that modified executable code 155 satisfies one or more performance thresholds for a code release. In response to determining that the performance satisfies this threshold level of performance, development computer system 101 may release modified executable code 155 to live computer system 180. In some embodiments, development computer system 101 may monitor performance of modified executable code 155 in operation on live computer system 180 to determine whether the performance continues to satisfy the threshold level.

It is noted that system 100, as illustrated in FIG. 1, is merely an example. FIG. 1 has been simplified to highlight features relevant to this disclosure. In other embodiments, additional elements that are not shown may be included, and/or different numbers of the illustrated elements may be included. For example, development computer system 101 may include a test development module to generate the third query 130*c* and receive corresponding test cases from generative AI tool 110, as well as, in some embodiments, to generate test cases supplemental to those generated by generative AI tool 110.

Figure 2:
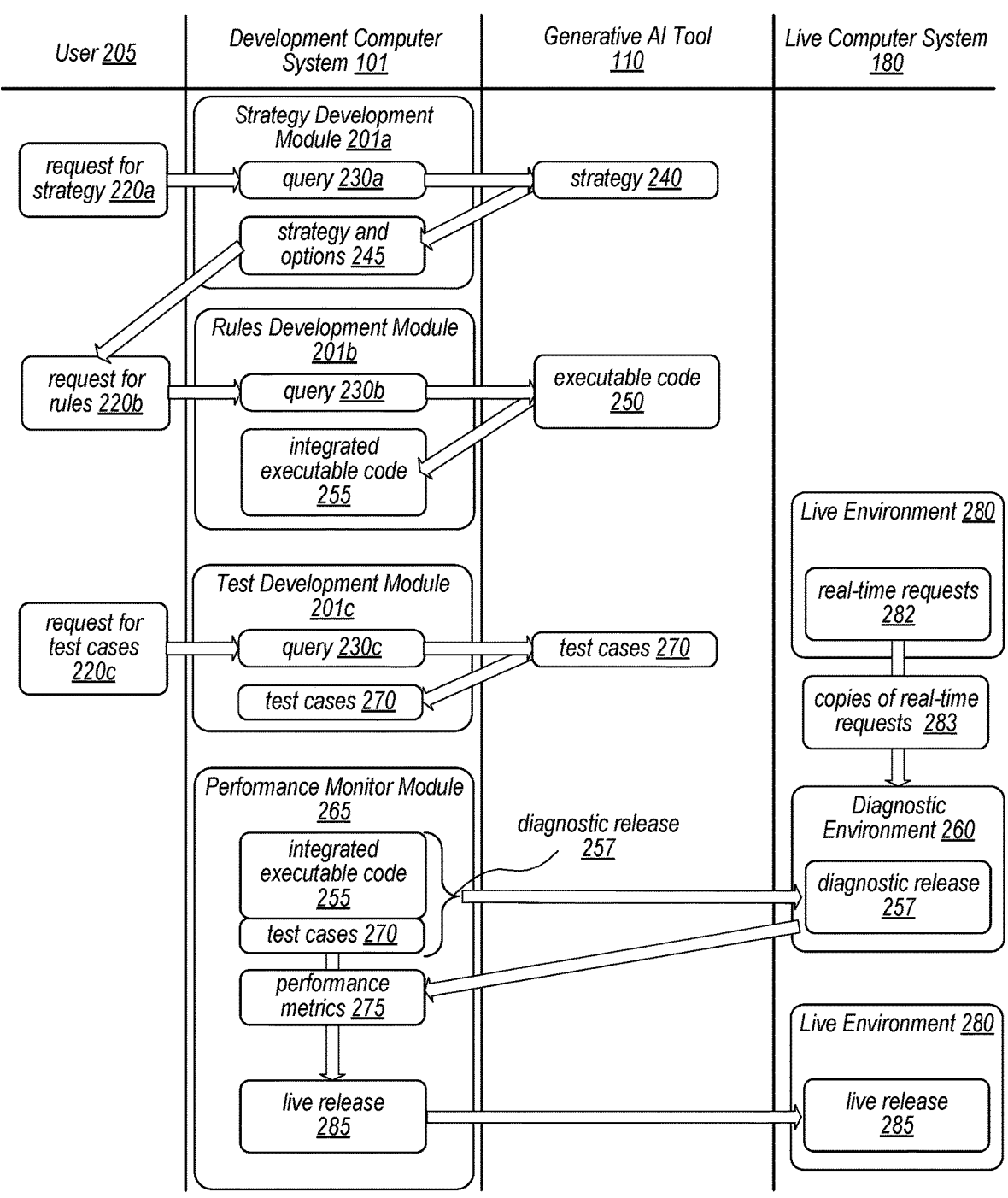
FIG. 2 shows an example of a flow of activities related to generating an evaluation strategy.

The description of FIG. 1 discloses use of a development computer system that interfaces with a user, a generative AI tool, and a live computer system. Such interactions may occur in a variety of fashions. FIG. 2 depicts an example of how a development computer system may interact with other elements, such as shown in system 100.

Moving to FIG. 2, an example of a process for developing a new evaluation strategy and releasing code for implementing the new strategy is shown. Development process 200 includes elements of system 100 from FIG. 1, including development computer system 101, generative AI tool 110, and live computer system 180. Development process 200 further includes user 205 who submits request for strategy 220*a* to development computer system 101. Development process 200 depicts a flow of activity related to the development of a new evaluation strategy and release of code to implement the new strategy.

User 205, as illustrated submits request for strategy 220*a* to development computer system 101. Request for strategy 220*a* may be a request for a new evaluation strategy related to any particular activity performed by live computer system 180, such as information security scans, risk management, fraud detection, and the like. Additionally, request for strategy 220*a* may be written in natural language text, such as "generate a strategy for evaluating documents stored in the portable document format (pdf) for compliance with the General Data Protection Regulation (GDPR)." User 205 may use a client device for generating and submitting request for strategy 220*a*. In some embodiments, user 205 may directly use development computer system 101 to generate request for strategy 220*a*.

Development computer system 101 receives request for strategy 220*a*, and uses strategy development module 201*a* to generate, for generative AI tool 110, query 230*a* to create evaluation strategy 240. To generate query 230*a*, strategy development module 201*a* may use natural-language programming techniques to parse and interpret text included in request for strategy 220*a*, thereby generating one or more intents for query 230*a*. In addition, strategy development module 201*a* may access one or more databases, such as database 170 in FIG. 1, to gather historical information that is relevant to the generated intents. This historical information and generated intents may then be used to generate query 230*a*. Strategy development module 201*a* may then submit query 230*a* to generative AI tool 110.

Generative AI tool 110 receives query 230*a* and uses the included information, including the intents and historical information, to generate strategy 240. Strategy 240 may include any suitable number of actionable strategies for evaluating stored pdf files for compliance with the GDPR. Such actionable strategies may include, for example, strategies for identifying types of information outlined in the GDPR that are included in stored pdfs, and strategies for determining, based on the identified types of information in a given pdf, whether the given pdf is stored with the proper safeguards in place. Generative AI tool 110 sends strategy 240 to development computer system 101.

In response to receiving strategy 240 in reply to query 230*a*, development computer system 101 may use rules development module 201*b* to generate, using strategy 240, query 230*b* for generative AI tool 110 to create executable code 250. In order to implement the received strategy 240, development computer system 101 transforms the information included in strategy 240 into a set of one or more rules that are implemented as program code. Strategy 240 may be received as natural language text. In order to deploy the strategy within live computer system 180, this natural language text is transformed into executable program code. This transformation may be accomplished by applying a program code framework that indicates a particular program language (or languages) for executable code 250. This framework may include some basic code snippets and/or some natural-language text for requesting executable code 250.

In some embodiments, development computer system 101 may add a plurality of options to the received strategy 240, thereby creating strategy and options 245, which may then be presented to user 205. The added options may include, for example, an option for user 205 to select particular ones of the one or more actionable strategies included in strategy 240 to further develop. In some cases, strategy 240 may include alternative strategies, allowing user 205 to select a particular one of the alternatives. User 205 may include selected options in request for rules 220*b* and then submit request for rules 220*b* to development computer system 101 to generate executable code 250. Rules development module 201*b* may then apply the framework to request for rules 220*b* to generate query 230*b*. In a similar manner as query 230*a*, query 230*b* may also include natural-language text. Query 230*b* may, in some embodiments, also include some program code, e.g., as a seed for generative AI tool 110 to generate executable code 250. Rules development module 201*b* submits query 230*b* to generative AI tool 110.

Generative AI tool 110 receives query 230*b* and, in response, generates executable code 250 based on the information included in query 230*b*. Executable code 250 may include one or more program functions for implementing evaluation rules as requested in query 230*b*. Executable code 250, however, may not be a complete program ready for independent execution on live computer system 180, but rather may include a series of code segments associated with individual rules. Executable code 250 may not include code for receiving input to be evaluated and/or code for generating output in a final format.

Development computer system 101 receives executable code 250 from generative AI tool 110. In response to receiving executable code 250 in reply to query 230*b*, rules development module 201*b* may modify the received code to integrate executable code 250 into a particular format for execution on live computer system 180, thereby generating integrated executable code 255. For example, rules development module 201*b* may add one or more program functions for ingesting data objects to be evaluated and/or for generating output in a desired format. Other integration modifications may include adding data paths for retrieving and/or storing data during code execution, inclusion of one or more constraints for operation, such as executing at particular times of the day or days of the week, or suspending executing during times of high activity in live computer system 180 to free bandwidth for other tasks.

After receiving strategy and options 245 from development computer system 101, user 205 may also create request for test cases 220*c*. Request for test cases 220*c* may include one or more directives for generating test cases 270 for exercising and testing executable code 250 prior to releasing executable code 250 to live computer system 180. Request for test cases 220*c* may be processed by test development module 201*c* in development computer system 101 to generate query 230*c*. In other embodiments, development computer system 101 may provide strategy 240 and/or integrated executable code 255 to test development module 201*c* to generate query 230*c*.

In response to receiving strategy 240 and/or integrated executable code 255, development computer system 101 may use test development module 201*c* to generate, using strategy 240 an/or integrated executable code 255, query 230*c* for generative AI tool 110 to generate test cases 270 for integrated executable code 255. In a manner such as used for queries 230*a* and 230*b*, test development module 201*c* may transform strategy 240 into query 230*c*. e.g., by creating particular text-based directives, for generating test cases 270. Test development module 201*c* submits query 230*c* to generative AI tool 110 which, in turn, creates test cases 270. Generative AI tool 110 sends test cases 270 to test development module 201*c*.

As illustrated, in response to receiving test cases 270 in response to query 230*c*, development computer system 101 uses performance monitor module 265 to test the performance of integrated executable code 255 with the received test cases 270. As shown, performance monitor module 265 launches integrated executable code 255 in diagnostic environment 260 in combination with test cases 270 as diagnostic release 257. In some embodiments, diagnostic environment 260 is included on live computer system 180. In other embodiments, diagnostic environment 260 may be included in development computer system 101 or a computer system different from either live computer system 180 and development computer system 101. In some embodiments, diagnostic environment 260 may be included in a combination of computer systems. Diagnostic environment 260 may isolate diagnostic release 257 from a live production environment (e.g., live environment 280) to prevent or minimize any negative and/or unexpected results due to the performance of integrated executable code 255 from impacting production services provided by live environment 280. To increase an effectiveness of the testing, diagnostic environment 260 may include a variety of processes and/or operating systems to reasonably emulate live environment 280. Diagnostic environment 260 may also include additional tools for aiding and enhancing the testing of diagnostic release 257.

Performance monitor module 265 monitors performance of integrated executable code 255 as test cases 270 are processed, thereby generating performance metrics 275. Returning to the scanning example, test cases 270 may include sandbox examples of stored pdfs to be scanned for compliance with storage protocols. Test cases may be based, at least in part, on real data such as may be extracted from historical information 125 in FIG. 1. In other embodiments, test cases 270 may be entirely generated by generative AI tool 110. Performance monitor module 265 may copy real-time requests 282 from users of an online service provided by live computer system 180 while integrated executable code 255 is performing in diagnostic environment 260. These copies of real-time requests 283 may then be used as input for integrated executable code 255 while in the testing is performed in diagnostic environment 260. Use of copies of real-time requests 283 may increase a similarity of diagnostic environment 260 to live environment 280, and in turn, result in increased accuracy of the testing.

The testing of diagnostic release 257 produces results that are captured as performance metrics 275. For example, some or all of test cases 270 may include an expected result which may be compared to actual test results produced by diagnostic release 257. A degree of similarity between test results and expected results may correspond to one or more metrics in performance metrics 275. In addition, performance metrics may include characteristics such as a time for completing each test case, an amount of bandwidth or other resources used to complete each test case, numbers of false positives cases (e.g., when a test pdf is flagged as being improperly stored when it shouldn't be flagged), a number of false negative cases (e.g., when a test pdf is not flagged as being improperly stored when it should be flagged), and the like. Performance metrics 275 may include any suitable information extracted from the testing of diagnostic release 257 that may provide data on a predicted performance of integrated executable code 255.

As illustrated, performance monitor module 265 uses performance metrics 275 to determine whether to release integrated executable code 255 into live environment 280. For example, in response to determining that performance metrics 275 satisfy a threshold level of performance, development computer system 101 may release integrated executable code 255 to live environment 280. Integrated executable code may be released as an application, background process, or script executable by live computer system 180. In some cases, the release of integrated executable code 255 may replace one or more code routines included in an existing program. For example, an existing program may extract code snippets that correspond to a particular rule or policy for implementing a particular evaluation strategy. The release of integrated executable code 255 may replace and/or be added to existing code snippets.

In some embodiments, development computer system 101 may monitor performance of integrated executable code 255 in live environment 280. Such monitoring may produce further performance metrics which, in turn, may be used to determine whether strategy 240 is being implemented as expected. Further details for monitoring the released integrated executable code 255 is described below in regards to FIG. 3.

In some embodiments, after receiving strategy and options 245 from development computer system 101, user 205 may also create a request (not shown) for creating documentation associated with strategy 240. This additional request may cause generative AI tool 110 to create textual documents in a specified format (e.g., pdf) that describes details about strategy 240. In some cases, such documentation may further include integration information for implementing strategy 240, details regarding executable code 250, and/or details regarding test cases 270. This generated documentation may be provided to user 205.

It is noted that the embodiment of FIG. 2 is merely an example to demonstrate the disclosed concepts. For clarity, some elements have been omitted. Several modules are described as being used by development computer system 101, such as strategy development module 201a, rules development module 201b, test development module 201c, and performance monitor module 265. These modules may be implemented as one or more programs executed by development computer system 101. The division between the modules is shown for clarity. In other embodiments, the described operations may be divided between any suitable number of modules, including, for example, one module that performs all operations. Although all modules are shown as being performed by development computer system 101, modules may be performed across any suitable number of computer systems. For example, strategy development module 201a and rules development module 201b may be performed by development computer system 101, while test development module 201c and performance monitor module 265 are performed by live computer system 180.

Figure 3:
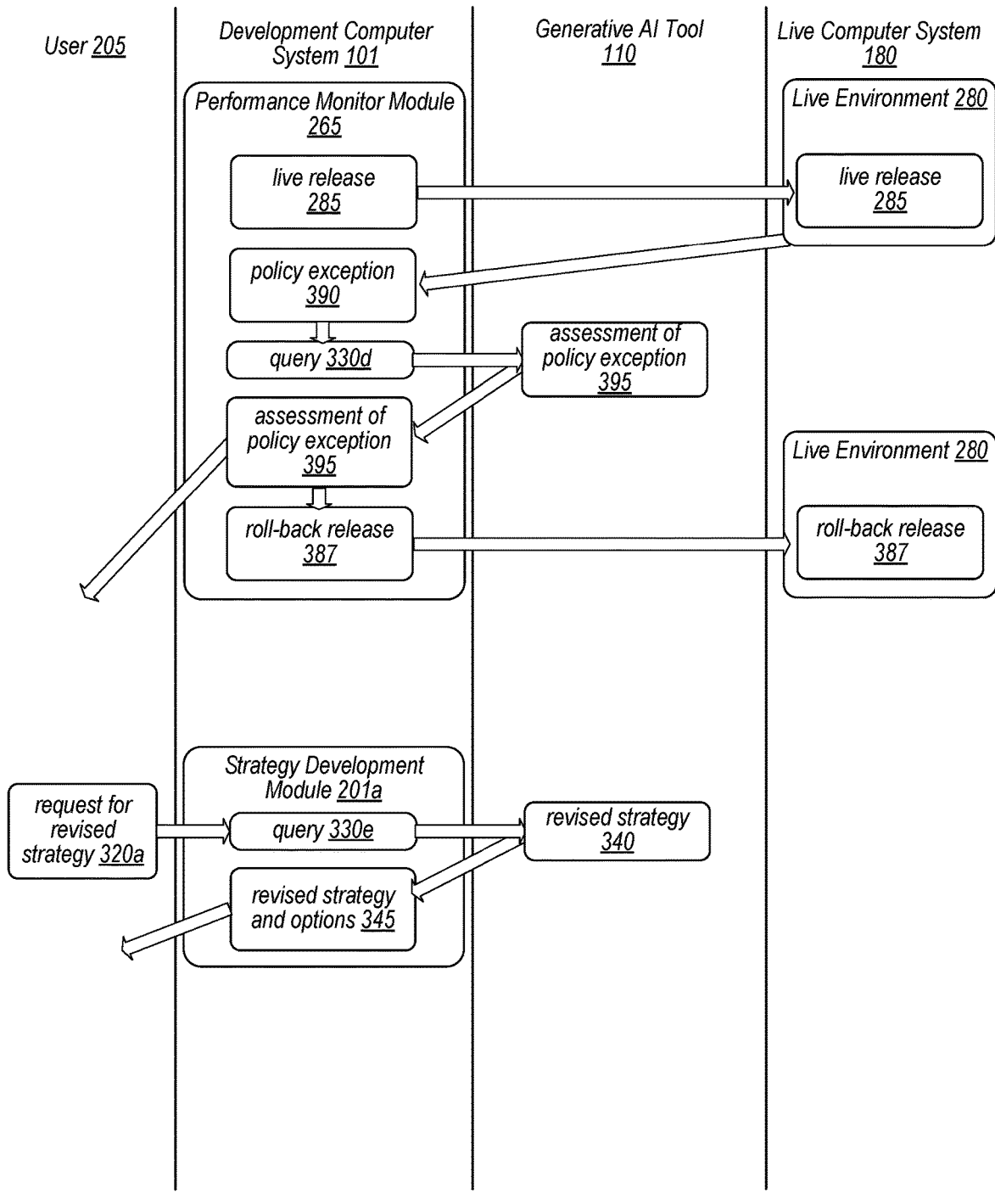
FIG. 3 depicts an example of a flow of activities related to releasing and monitoring code to implement an evaluation strategy.

Turning to FIG. 3, the example process for developing a new evaluation strategy and releasing code from FIG. 2 is continued, illustrated a further process for monitoring performance of released code. Similar to development process 200, development process 300 includes elements from FIG. 1, including development computer system 101, generative AI tool 110, and live computer system 180, and user 205 from FIG. 2. Development process 300 depicts a flow of activity related to monitoring a release of code developed for a new evaluation strategy. This flow continues from development process 200 of FIG. 2.

As illustrated, development computer system 101, using performance monitor modules 265, prepares and releases integrated executable code 255 as live release 285. After release, development computer system 101 monitors, using performance monitor module 265, performance of integrated executable code 255 in live environment 280. This monitoring may include observing some or all results produced by live release 285, and the monitoring may be performed real-time and/or by reviewing one or more performance logs that hold inputs and outputs associated with operation of live release 285.

Based on the monitoring, development computer system 101 may determine that performance of live release 285 falls below one or more performance thresholds for production operation. For example, performance monitor module 265 may detect policy exception 390 during the monitoring. Policy exception 390 may be an observed deviation from evaluation strategy 240 such as generating a false positive or false negative evaluation result. In response to determining that performance of live release 285 fails to satisfy a threshold level of performance, performance monitor module 265 may revert to a prior version of code, roll-back release 387. In response to policy exception 390, performance monitor module 265 may generate query 330*d* for generative AI tool 110 to assess policy exception 390. Query 330*d* may include one or more directives or questions related to policy exception 390, with an intent to assess, e.g., causes for why a result was produced that appears to be in contrast to strategy 240. Query 330*d* is sent, by performance monitor module 265, to generative AI tool 110 for evaluation. Performance monitor module 265 may then receive assessment of the policy exception 395 from generative AI tool 110. Based on assessment of the policy exception 395, performance monitor module 265 may revert to roll-back release 387 by replacing live release 285 with roll-back release 387.

In some embodiments, development computer system 101 may submit, in response to reverting to the prior version of code, a revised first query (e.g., query 330*e*) to generative AI tool 110 to generate revised strategy 340. In some embodiments, development computer system 101 may receive request for revised strategy 320*a*. In other embodiments, development computer system 101 may generate query 330*e* for generative AI tool 110. Query 330*e* may be generated using information included in request for revised strategy 320*a* and request for strategy 220*a*, and may include one or more directives with an intent to revise strategy 240 such that policy exceptions similar to policy exception 390 may be avoided in a revised code release. Development computer system 101 submits query 330*e* to generative AI tool 110.

As illustrated, generative AI tool 110 creates revised strategy 340, and development computer system 101 receives revised strategy 340. Development computer system 101 may further add options, thereby creating revised strategy and options 345. Options may be added similar to as described above for strategy and options 245 in FIG. 2, and then presented to user 205. In some embodiments, user 205 may select one or more of the options presented in strategy and options 345 and submit one or more further requests to develop a revised version of executable code 250.

It is noted that FIG. 3, in a like manner as FIG. 2, is an example to demonstrate the disclosed techniques. Only elements needed to illustrate these techniques are shown. Two modules are shown as being implemented on development computer system 101, strategy development module 201*a* and performance monitor module 265. These modules may be implemented as one or more programs executed by development computer system 101. The division between the modules is shown for clarity and in various embodiments, may be implemented as any suitable number of programs executed on development computer system 101 and/or other computer systems such as live computer system 180. In some embodiments, for example, the various disclosed modules may be implemented as instructions stored on a non-transient, computer-readable memory accessible by development computer system 101, live computer system 180, and/or other suitable computer systems.

The systems described above in regard to FIGS. 1-3 may perform the disclosed techniques using a variety of methods. FIGS. 4 and 5 illustrate two such methods.

Proceeding to FIG. 4, a flow diagram for an embodiment of a method for performing a live video user authentication is shown. Method 400 may be performed by a computer system such as any suitable ones of development computer system 101 or live computer system 180 as shown in the various figures. In some embodiments, method 400 may be performed by a combination of such computer systems. Using FIG. 1 as an example, development computer system 101 may include (or have access to) a non-transient, computer-readable memory having program instructions stored thereon that are executable by development computer system 101 to cause the operations described with reference to FIG. 4. Method 400 is described below using development computer system 101 of FIG. 1 as an example. References to elements in FIG. 1 are included as non-limiting examples.

Method 400 begins at 410 by in response to receiving a request to develop an evaluation strategy, transforming, by a development computer system, the request into a first query for a generative artificial intelligence (AI) tool. For example, development computer system 101 receives request 120 (e.g., from user 205 in FIG. 2). Request 120 may be a request to develop a new or revised evaluation strategy for any suitable type of computer performed evaluation, such as has been described above. Request 120 may be written in natural language text and include one or more directives for creating the new or revised evaluation strategy. Development computer system 101 may extract particular information from request 120 using natural-language processing. Such information may include determining one or more keywords and/or phrases related to a particular type of evaluation for which a new or revised strategy is being requested. Development computer system 101 may use this extracted information to generate query 130*a* to cause generative AI tool 110 to create evaluation strategy information 140.

At 420, method 400 continues by retrieving, by the development computer system from a database, historical information that is related to the first query. Development computer system 101, for example, may use the information extracted from request 120 to retrieve particular types of historical information 125 that has been captured and stored into, e.g., one or more log files maintained in database 170. Development computer system 101 may also preprocess retrieved historical information 125 prior to submitting query 130*a*. Preprocessing may include removal of sensitive information from historical information 125. For example, the requested evaluation strategy may be related to fraud detection, and historical information 125 may include log entries associated with electronic exchanges involving a fraud determination. The preprocessing, in such a case, may involve removing any identifying information for any entities involved in a given one of the electronic exchanges.

Historical information 125 may include a plurality of various patterns related, for example, to activity associated with users of a particular online service, or related to types of data stored in one or more databases, or any other suitable data patterns. In some embodiments, historical information 125 may include gigabytes, terabytes, or larger, amounts of data. Accordingly, historical information 125 may be far too large for humans to ingest and analyze thoroughly. Generative AI tool 110, however, may be capable of ingesting very large amounts of data and identifying patterns between a relatively small subset of the data. In other embodiments, connections between various portions of historical data may not be visible to typical forms of human analysis, but may be identified by generative AI tool 110.

Method 400 proceeds at 430 by submitting, by the development computer system, the historical information and the first query to the generative AI tool. For example, development computer system 101 may use the information extracted from request 120 and historical information 125 to develop query 130*a*. Query 130*a* may include one or more directives with intents to cause generative AI tool 110 to create evaluation strategy information 140. To generate an evaluation strategy associated with fraud detection, for example, query 130*a* may include directives such as, "Generate rules for identifying a fraudulent sender based on patterns found in historical data of confirmed fraudulent activity." After query 130*a* has been created, development computer system 101 may send query 130*a* to generative AI tool 110.

At 440, method 400 further continues by in response to receiving evaluation strategy information in reply to the first query, transforming, by the development computer system, the evaluation strategy information into a second query for the generative AI tool. After receiving query 130*a*, generative AI tool 110 responds with evaluation strategy information 140. Evaluation strategy information 140 may include one or more rules, e.g., expressed in natural language, for implementing a strategy as requested in query 130*a*. For example, in response to the above example directive, one of one or more generated rules may be, "Identify other entities involved in transaction with a given sender and determine a rate of detected fraudulent activity in electronic exchanges between the given sender and the identified other entities." Evaluation strategy information 140 may include one or more rules for each directive included in query 130*a*. Development computer system 101 may transform evaluation strategy information 140 into query 130*b* to cause generative AI tool 110 to generate executable code 150. This transformation may include using the received rules and/or any other included information to create directives for implementing executable code for ones of the rules included in evaluation strategy information 140.

The method continues at block 450 by submitting, by the development computer system, the second query to the generative AI tool. After development computer system 101 has generated query 130*b*, query 130*b* is submitted to generative AI tool 110. In a similar manner as for query 130*a*, query 130*b* may include one or more natural-language directives intended to cause generative AI tool 110 to generate executable code for implementing rules included in evaluation strategy information 140. In some embodiments, query 130*b* may include directives indicating a type of program code (e.g., a particular program language) and/or particular input and output formats which executable code 150 should support.

At 460, method 400 continues by in response to receiving executable code in reply to the second query, modifying, by the development computer system, the executable code for compatibility with a particular computer system. After generative AI tool 110 creates executable code 150, development computer system 101 receives executable code 150 and may analyze a state of the code. Executable code 150, as shown, is intended to be performed on live computer system 180. Although generative AI tool 110 may return executable code 150 that is written in a compatible program language for live computer system 180 and may be written to receive inputs and generate outputs in a specified format, additional modifications may be made in order to perform properly on live computer system 180. For example, particular data paths may need to be included as well as creation and/or changing application program calls to executable code 150. In some embodiments, executable code 150 may be integrated into one or more existing programs already released to live computer system 180. In such cases, modifications may include altering executable code 150 to be compatible with the one or more existing programs. Alterations to executable code 150 result in the generation of modified executable code 155.

Method 400 proceeds at 470 by testing, by the development computer system, performance of the modified executable code in a diagnostic environment. Prior to releasing modified executable code 155, the code may be tested in diagnostic environment 160 to evaluate whether modified executable code 155 satisfies expectations of the original request 120. Development computer system causes modified executable code 155 to be exercised in diagnostic environment 160 where performance monitor 165 may observe results generated by modified executable code 155 in response to one or more test cases used as input. Performance monitor 165 may determine a degree of similarity of the test results to expected results for a given test case. In some embodiments, development computer system 101 may transform evaluation strategy information into a third query (e.g., query 130*c*, not shown) to generate test cases for modified executable code 155. This query 130*c* may be submitted, by development computer system 101, to the generative AI tool which may return one or more test cases for use as input to the evaluation of modified executable code 155.

In addition to, or in place of, test cases generated by generative AI tool 110, development computer system 101 may, while modified executable code 155 is performing in diagnostic environment 160, copy real-time requests from users of an online service provided by live computer system 180. These copies of the real-time requests may also be used as test input for modified executable code 155 in the evaluation. In response to receiving test cases (generated and/or copied), development computer system uses the received test cases for the testing of the performance of modified executable code 155, for example, generating one or more performance metrics that are indicative of how well modified executable code 155 satisfies request 120.

At 480, method 400 further continues by indicating, by the development computer system, that the modified executable code satisfies one or more performance thresholds for a code release. For example, development computer system 101 compares performance metrics to one or more threshold levels. Such threshold levels may be included in request 120 and/or generated in response to queries 130*a* and/or 130*b*. Threshold levels may be established based, e.g., on performance benchmarks established existing released executable code. In some cases, threshold levels may be established based on new or revised regulations, such as mandated by a government, an industry, or a corporation.

It is noted that the method of FIG. 4 includes elements 410-480. Method 400 may end in 480 or may repeat some or all elements of the method. For example, method 400 may return to 410 or 440 to revise query 130*a* and/or 130*b* if testing of modified executable code 155 fails to satisfy one or more threshold levels (additional details of such cases are disclosed below). As another example, method 400 may repeat blocks 450 and 460 for multiple iterations in order to develop different versions or revisions of executable code, until a suitable version or versions have been generated. In some cases, method 400 may be performed concurrently with other instances of the method. For example, multiple instances of method 400 may be performed to concurrently develop multiple evaluation strategies for respective users.

Moving to FIG. 5, a flow diagram for an embodiment of a method for monitoring released executable code is shown. In a manner as described above for method 400, method 500 may be performed by a computer system such as any of the computer systems, devices and servers disclosed herein, including, but not limited to development computer system 101 and live computer system 180. In a similar fashion as described for method 400, development computer system 101 may include (or have access to) a non-transient, computer-readable memory having program instructions stored thereon that are executable by development computer system 101 to cause the operations described with reference to FIG. 5. Method 500 is described below using FIG. 3 as an example. References to elements in FIG. 3 are included as non-limiting examples. Method 500 may, in some embodiments, begin after block 480 of method 400.

Method 500 begins at 510 by the development computer system releasing, in response to the indicating, the modified executable code to a production environment. For example, development computer system 101 may, in response to the indicating in block 480 of method 400, generate live release 285 using modified executable code 155 from FIG. 1. Live release 285 may then be released into live environment 280 on live computer system 180.

At 520, method 500 continues by the development computer system monitoring performance of the modified executable code. As shown in FIG. 3, development computer system monitors performance of live release 285. This monitoring may include evaluating results produced by live release 285 based on particular sets of input. In some cases, the monitoring may be real-time, with results evaluated as they are produced. In other cases, results may be logged and evaluated by development computer system 101 at a later time, such as at a regularly scheduled interval (e.g., hourly, daily, weekly, monthly, etc.) and/or after a particular number of results have been produced by live release 285 (e.g., after every 100, 1000, or 1,000,000 results).

Method 500 continues at 530 by the development computer system determining that performance of the modified executable code falls below one or more performance thresholds for production operation. Development computer system 101 may, for example, detect policy exception 390 based on a given result produced by live release 285. Policy exception 390 may be an indication that the given result does not appear to be in compliance with one or more rules determined from evaluation strategy information 140 in FIG. 1. Development computer system 101 may further analyze policy exception 390 to determine whether live release 285 is performing to a threshold level of performance. For example, development computer system 101 may generate query 330*d* based on policy exception 390 and evaluation strategy information 140 to request generative AI tool 110 to assess policy exception 390. A resulting assessment of policy exception 395 may include information regarding a degree of separation between policy exception 390 and evaluation strategy information 140 and/or identification of one or more possible causes for differences between policy exception 390 and expected results.

At 540, method 500 continues by the development computer system reverting to a prior version of code. For example, development computer system 101 determines, based on assessment of policy exception 395, that live release 285 is not satisfying a threshold level of performance, and therefore should be rolled-back to a prior version of code. Based on this determination, roll-back release 387 is released to live environment 280 and live release 285 is removed or otherwise deactivated. Roll-back release 387 may be a most recent version of code prior to the release of live release 285, or may be any other prior version that satisfies a particular threshold of performance. In some cases, two or more prior code releases may be used to replace live release 285.

Method 500, at 550, continues by the development computer system revising the second query for the generative AI tool. In some embodiments, development computer system 101 may revise query 130*b* that was used to generate executable code 150 as shown in FIG. 1. Such revisions may be based on policy exception 390 and/or assessment of policy exception 395. The revisions may add one or more directives to query 130*b* to create a revised query 130*b* (e.g., query 130*c*, not shown in FIG. 1 or 3). Instead or in addition, the revisions may alter one or more of the directives from query 130*b*. The revisions may attempt to mitigate a probability that policy exception 390 will occur again if similar inputs are received.

Method 500 continues at 560 by the development computer system submitting the revised second query to the generative AI tool. As illustrated in FIG. 3, after query 130*c* has been generated, development computer system 101 submits query 130*c* to generative AI tool 110. Generative AI tool 110 may respond to query 130*c* with revised executable code. The revised executable code may include code that is similar to executable code 150, but with additional or altered code segments that address any determined causes for policy exception 390. In other cases, the revised executable code may be significantly different from executable code 150

It is noted that the method of FIG. 5 includes elements 510-560. Method 500 may end in 560 or may repeat some or all elements of methods 400 and 500. For example, further operations may be similar to operations 460-480 of method 400 and 510 and 520 of method 500, resulting in modified revised executable code being created, tested, released, and monitored. In some cases, method 500 may be performed concurrently with other instances of the method and/or instances of method 400. For example, different instances of method 500 may be performed to assess more than one detected policy exception.

Figure 6:
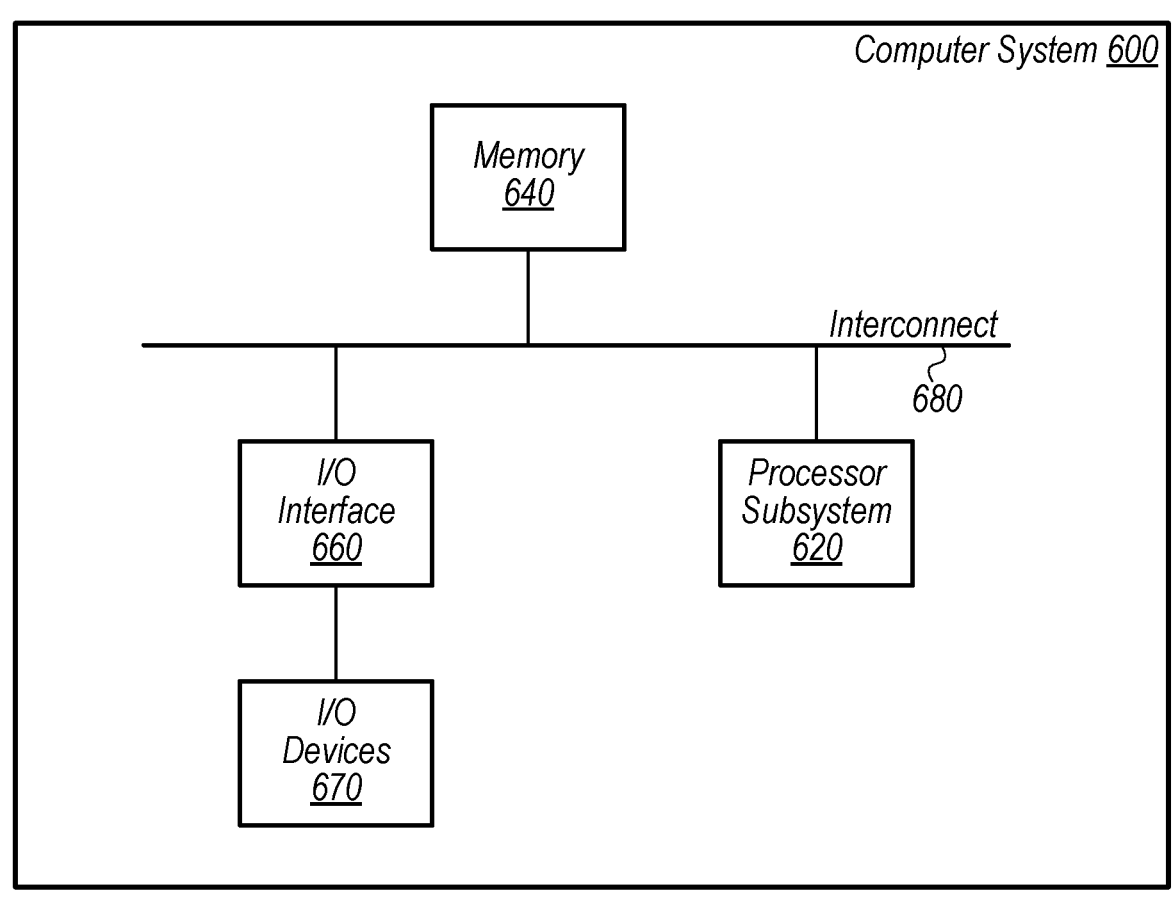
FIG. 6 depicts a block diagram of an embodiment of a computer system that may be used to implement one or more embodiments of the disclosed system.

In the descriptions of FIGS. 1-5, various embodiments of a computer system for implementing the disclosed techniques have been disclosed, such as development computer system 101 and live computer system 180 as shown in FIGS. 1-3. These computer systems may be implemented in a variety of manners. FIG. 6 provides an example of a computer system that may correspond to one or more of the disclosed systems.

Referring now to FIG. 6, a block diagram of an example computer system 600 is depicted. Computer system 600 may, in various embodiments, be an implementation of one or more of the disclosed computer systems, such as development computer system 101 and live computer system 180. Computer system 600 includes a processor subsystem 620 that is coupled to a system memory 640 and I/O interfaces(s) 660 via an interconnect 680 (e.g., a system bus). I/O interface(s) 660 is coupled to one or more I/O devices 670. Computer system 600 may be any of various types of devices, including, but not limited to, a server computer system, personal computer system, desktop computer, laptop or notebook computer, mainframe computer system, server computer system operating in a datacenter facility, tablet computer, handheld computer, smartphone, worksta-
tion, network computer, connected vehicle, etc. Although a
single computer system 600 is shown in FIG. 6 for conve-
nience, computer system 600 may also be implemented as
two or more computer systems operating together, e.g., as a
virtual computer system.

Processor subsystem 620 may include one or more pro-
cessor circuits. In various embodiments of computer system
600, multiple instances of processor subsystem 620 may be
coupled to interconnect 680. In various embodiments, pro-
cessor subsystem 620 (or each processor unit within 620)
may contain a cache or other form of on-board memory.

System memory 640 is usable to store program instruc-
tions executable by processor subsystem 620 to cause com-
puter system 600 perform various operations described
herein, including, for example, methods 400 and 500. Sys-
tem memory 640 may be implemented using any suitable
type of memory circuits including, for example, different
physical, non-transient, computer-readable media, such as
hard disk storage, floppy disk storage, removable disk
storage, flash memory, random access memory (RAM-
SRAM, EDO RAM, SDRAM, DDR SDRAM, LPDDR
SDRAM, etc.), read-only memory (PROM, EEPROM, etc.),
and so on. Memory circuits in computer system 600 are not
limited to primary storage such as system memory 640.
Rather, computer system 600 may also include other forms
of storage such as cache memory in processor subsystem
620 and secondary storage in I/O devices 670 (e.g., a hard
drive, storage array, etc.). In some embodiments, these other
forms of storage may also store program instructions execut-
able by processor subsystem 620.

I/O interfaces 660 may be any of various types of inter-
faces configured to couple to and communicate with other
devices, according to various embodiments. In one embodi-
ment, I/O interface 660 is a bridge chip (e.g., Southbridge)
from a front-side to one or more back-side buses. I/O
interfaces 660 may be coupled to one or more I/O devices
670 via one or more corresponding buses or other interfaces.
Examples of I/O devices 670 include storage devices (hard
drive, optical drive, removable flash drive, storage array,
SAN, or their associated controller), network interface
devices (e.g., to a local or wide-area network), or other
devices (e.g., graphics, user interface devices, etc.). In one
embodiment, I/O devices 670 includes a network interface
device (e.g., configured to communicate over Wi-Fi®, Blu-
etooth®, Ethernet, etc.), and computer system 600 is
coupled to a network via the network interface device.

The various techniques described herein may be per-
formed by one or more computer programs. The term
"program" is to be construed broadly to cover a sequence of
instructions in a programming language that a computing
device can execute. These programs may be written in any
suitable computer language, including lower-level lan-
guages such as assembly and higher-level languages such as
Python. The program may be written in a compiled language
such as C or C++, or an interpreted language such as
JavaScript.

Program instructions may be stored on a "computer-
readable storage medium" or a "computer-readable
medium" in order to facilitate execution of the program
instructions by a computer system. Generally speaking,
these phrases include any tangible or non-transitory storage
or memory medium. The terms "tangible" and "non-transi-
tory" are intended to exclude propagating electromagnetic
signals, but not to otherwise limit the type of storage
medium. Accordingly, the phrases "computer-readable stor-
age medium" or a "computer-readable medium" are intended to cover types of storage devices that do not
necessarily store information permanently (e.g., random
access memory (RAM)). The term "non-transitory," accord-
ingly, is a limitation on the nature of the medium itself (i.e.,
the medium cannot be a signal) as opposed to a limitation on
data storage persistency of the medium (e.g., RAM vs.
ROM).

The phrases "computer-readable storage medium" and
"computer-readable medium" are intended to refer to both a
storage medium within a computer system as well as a
removable medium such as a CD-ROM, memory stick, or
portable hard drive. The phrases cover any type of volatile
memory within a computer system including DRAM, DDR
RAM, SRAM, EDO RAM, Rambus RAM, etc., as well as
non-volatile memory such as magnetic media, e.g., a hard
drive, or optical storage. The phrases are explicitly intended
to cover the memory of a server that facilitates downloading
of program instructions, the memories within any interme-
diate computer system involved in the download, as well as
the memories of all destination computing devices. Still
further, the phrases are intended to cover combinations of
different types of memories.

In addition, a computer-readable medium or storage
medium may be located in a first set of one or more
computer systems in which the programs are executed, as
well as in a second set of one or more computer systems
which connect to the first set over a network. In the latter
instance, the second set of computer systems may provide
program instructions to the first set of computer systems for
execution. In short, the phrases "computer-readable storage
medium" and "computer-readable medium" may include
two or more media that may reside in different locations,
e.g., in different computers that are connected over a net-
work.

Note that in some cases, program instructions may be
stored on a storage medium but not enabled to execute in a
particular computing environment. For example, a particular
computing environment (e.g., a first computer system) may
have a parameter set that disables program instructions that
are nonetheless resident on a storage medium of the first
computer system. The recitation that these stored program
instructions are "capable" of being executed is intended to
account for and cover this possibility. Stated another way,
program instructions stored on a computer-readable medium
can be said to "executable" to perform certain functionality,
whether or not current software configuration parameters
permit such execution. Executability means that when and if
the instructions are executed, they perform the functionality
in question.

The present disclosure refers to various operations that are
performed in the context of instructions executed by one or
more computer systems. For example, methods 400 and 500
are described as, in some embodiments, being performed by
development computer system 101 and live computer sys-
tem 180 as shown in FIGS. 1-3. In addition, various pro-
cesses (e.g., strategy development module 201*a* in FIGS. 2
and 3) are described as being performed by a computer
system such as development computer system 101 and live
computer system 180 in various ones of FIGS. 1-5). Devel-
opment computer system 101 may include one or more
computer systems included, for example, in one or more
data centers (physical facilities that store data that drives
enterprise computing applications and provides online ser-
vices to users via, e.g., the Internet). These components,
therefore, are implemented on physical structures (i.e., on
computer hardware).

In general, any of the services or functionalities of a software development environment described in this disclosure can be performed by a host computing device, which is any computer system that is capable of connecting to a computer network. A given host computing device can be configured according to any known configuration of computer hardware. A typical hardware configuration includes a processor subsystem, memory, and one or more I/O devices coupled via an interconnect. A given host computing device may also be implemented as two or more computer systems operating together.

The processor subsystem of the host computing device may include one or more processor circuits or processing units. In some embodiments of the host computing device, multiple instances of a processor subsystem may be coupled to the system interconnect. The processor subsystem (or each processor unit within a processor subsystem) may contain any of various processor features known in the art, such as a cache, hardware accelerator, etc.

The system memory of the host computing device is usable to store program instructions executable by the processor subsystem to cause the host computing device to perform various operations described herein. The system memory may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read-only memory (PROM, EEPROM, etc.), and so on. Memory in the host computing device is not limited to primary storage. Rather, the host computing device may also include other forms of storage such as cache memory in the processor subsystem and secondary storage in the I/O devices (e.g., a hard drive, storage array, etc.). In some embodiments, these other forms of storage may also store program instructions executable by the processor subsystem.

The interconnect of the host computing device may connect the processor subsystem and memory with various I/O devices. One possible I/O interface is a bridge chip (e.g., Southbridge) from a front-side to one or more back-side buses. Examples of I/O devices include storage devices (hard drive, optical drive, removable flash drive, storage array, SAN, or their associated controller), network interface devices (e.g., to a computer network), or other devices (e.g., graphics, user interface devices.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

In this disclosure, various "modules" and "models" operable to perform designated functions are shown in the figures and described in detail (e.g., strategy development module 201*a*, rules development module 201*b*, test development module 201*c*, performance monitor module 265, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as "operable" to perform operations refers to a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa.

US 12,650,916 B2

21

What is claimed is:

1. A method for developing evaluation code, comprising:
in response to receiving a request to develop an evaluation strategy, transforming, by a development computer system, the request into a first query for a generative artificial intelligence (AI) tool;
retrieving, by the development computer system from a database, historical information that is related to the first query;
submitting, by the development computer system, the historical information and the first query to the generative AI tool;
in response to receiving evaluation strategy information in reply to the first query, transforming, by the development computer system, the evaluation strategy information into a second query for the generative AI tool;
submitting, by the development computer system, the second query to the generative AI tool;
in response to receiving executable code in reply to the second query, modifying, by the development computer system, the executable code for compatibility with a particular computer system;
testing, by the development computer system, performance of the modified executable code in a diagnostic environment;
based on indications that the modified executable code satisfies one or more performance thresholds for a code release, releasing, by the development computer system, the modified executable code to a production environment; and
based on determining that the performance of the released modified executable code falls below one or more performance thresholds for production operation:
reverting, by the development computer system, to a prior version of the executable code; and
submitting, by the development computer system, a revised version of the second query to the generative AI tool.

2. The method of claim 1, further comprising:
transforming, by the development computer system, the evaluation strategy information into a third query to generate test cases for the executable code;
submitting, by the development computer system, the third query to the generative AI tool; and
in response to receiving the test cases in response to the third query, using, by the development computer system, the received test cases for the testing of the performance of the modified executable code.

3. The method of claim 1, further comprising preprocessing, by the development computer system, the retrieved historical information prior to submitting the first query, wherein the preprocessing includes removal of sensitive information from the retrieved historical information.

4. The method of claim 2, wherein the received test cases include respective expected results for ones of the received test cases; and
wherein releasing the modified executable code to the production environment includes releasing the modified executable code to the production environment based on a comparison of the respective expected results to actual results for the ones of the received test cases.

5. The method of claim 1, wherein determining that the performance of the modified executable code falls below the one or more performance thresholds for the production operation includes:

detecting, by the development computer system, one or more policy exceptions in results from the released modified executable code; and
submitting, by the development computer system, a fourth query to the generative AI tool to assess the one or more policy exceptions.

6. The method of claim 5,
wherein reverting to the prior version of the executable code includes:
receiving, by the development computer system in response to the fourth query, an assessment of the one or more policy exceptions; and
determining, by the development computer system based on the assessment, to revert to the prior version of the executable code.

7. The method of claim 1, further comprising:
while the modified executable code is performing in the diagnostic environment, copying, by the development computer system, real-time requests from users of an online service provided by the particular computer system, wherein copies of the real-time requests are used as input for the modified executable code.

8. A non-transient, computer-readable medium including instructions that when executed by a computer system, cause the computer system to perform operations including:
generating, for a generative artificial intelligence (AI) tool, a first query to create an evaluation strategy;
in response to receiving the evaluation strategy in reply to the first query, generating, using the evaluation strategy, a second query for the generative AI tool to create executable code;
in response to receiving the executable code in reply to the second query, integrating the executable code into a particular computer system;
monitoring performance of the executable code, wherein the executable code operates in a diagnostic environment in the particular computer system based on indications that the executable code satisfies a threshold level of performance, releasing the executable code to a live environment; and
based on determining that the performance of the executable code fails to satisfy the threshold level of performance in the live environment:
reverting to a prior version of the executable code; and
based on reverting to the prior version of the executable code, submitting, a revised first query to the generative AI tool.

9. The computer-readable medium of claim 8, wherein the operations further include:
in response to receiving the evaluation strategy in reply to the first query, generating, using the evaluation strategy, a third query for the generative AI tool to generate test cases for the executable code, wherein monitoring the performance of the executable code includes using the generated test cases to generate performance metrics.

10. The computer-readable medium of claim 9, wherein releasing the executable code to the live environment includes:
using the performance metrics to determine whether to release the executable code into the live environment; and
in response to determining that the performance metrics satisfy the threshold level of performance, releasing the executable code to the live environment.

11. The computer-readable medium of claim 8, wherein determining that the performance of the executable code fails to satisfy the threshold level of performance in the live environment includes;

detecting one or more policy exceptions in results from the executable code in the live environment; and submitting a third query to the generative AI tool to assess the one or more policy exceptions.

12. The computer-readable medium of claim 11, wherein reverting to the prior version of the executable code includes:

receiving, in response to the third query, an assessment of the one or more policy exceptions; and determining, based on the assessment, to revert to the prior version of the executable code.

13. The computer-readable medium of claim 8, wherein the monitoring of the performance of the executable code includes:

copying, from users of an online service provided by the particular computer system, real-time requests for use as input for the executable code operating in the diagnostic environment.

14. The computer-readable medium of claim 8, wherein the operations further include:

in response to receiving the evaluation strategy in reply to the first query, generating, using the evaluation strategy, a third query for the generative AI tool to create documentation for the evaluation strategy and the executable code.

15. A system comprising:

a processor circuit; and a memory circuit including instructions that when executed by the processor circuit, cause the system to perform operations including:

in response to a particular request to create an evaluation strategy, generating, using information included in the particular request, a first query to a generative artificial intelligence (AI) tool;

in response to receiving the evaluation strategy in reply to the first query:

generating, using the evaluation strategy, a second query for the generative AI tool to create executable code; and generating, using the evaluation strategy, a third query for the generative AI tool to create test cases for evaluating the executable code;

in response to receiving the executable code in reply to the second query, integrating the executable code into a particular computer system;

in response to receiving the test cases in reply to the third query, evaluating performance of the executable code in a diagnostic environment;

based on determining that the performance satisfies a threshold level of performance, releasing the executable code to a live environment;

detecting a policy exception by the released executable code, wherein the policy exception is an observed deviation from the evaluation strategy;

based on the policy exception, generating a fourth query for the generative AI tool to assess the policy exception; and based on a received assessment of the policy exception from the generative AI tool, reverting to a prior version of the executable code.

16. The system of claim 15, wherein the operations further include:

in response to determining that the performance does not satisfy the threshold level of performance, submitting, a revised first query to the generative AI tool.

17. The system of claim 15, wherein the received test cases include respective expected results for ones of the received test cases; and wherein evaluating the performance of the executable code in the diagnostic environment includes comparing the respective expected results to actual results for the ones of the received test cases.

18. The system of claim 15, wherein generating the first query to the generative AI tool includes:

retrieving, from a database, historical information that is related to the first query; and including at least a portion of the historical information in the first query.

19. The system of claim 18, wherein evaluating the performance of the executable code in the diagnostic environment includes:

copying real-time requests from users of an online service that includes the processor circuit; and using copies of the real-time requests as input for the executable code in the diagnostic environment.

20. The system of claim 15, wherein the operations further include:

receiving a different request to revise the evaluation strategy; and generating, using information included in the different request and the particular request, a fourth query to the generative AI tool to create a revised evaluation strategy.

\* \* \* \* \*